UNITED STATES PATENT OFFICE.

JAMES C. McANINCH AND GEORGE ATKINS, OF YOUNGSTOWN, OHIO.

IMPROVEMENT IN FETTLING FOR PUDDLING AND BOILING FURNACES.

Specification forming part of Letters Patent No. 136,083, dated February 18, 1873.

*To all whom it may concern:*

Be it known that we, JAMES C. McANINCH and GEORGE ATKINS, of Youngstown, in the county of Mahoning and State of Ohio, have invented a new and Improved Preparation for Fettling Puddling or Boiling Furnaces, of which the following is a specification:

Our invention has for its object to furnish, and consists in, an improved preparation of ground sand-rock for fettling or fixing puddling or boiling furnaces for manufacturing iron or steel, as hereinafter fully described.

This preparation is formed of pulverized sand-stone mixed with a sufficient quantity of water or other liquid or liquids to reduce it to the consistency of mortar.

The preparation is placed around the inside of the furnace against the bridge, back, and jamb-chills to protect said parts and keep them from coming in contact with the iron, and from being injured by the intense heat.

The preparation is designed to take the place of the iron ore heretofore used for this purpose.

Having thus described our invention, we claim as new and desire to secure by Letters Patent—

An improved preparation formed by mixing pulverized sand-stone with sufficient water or other liquid or liquids to reduce it to the consistency of mortar, to be applied to the inside bridge, back, and jamb-chills of furnaces in the manufacture of iron and steel, substantially as herein described, and for the purpose set forth.

JAMES C. McANINCH.
GEORGE ATKINS.

Witnesses:
GEORGE W. VAUGHAN,
JOHN M. EDWARDS.